United States Patent [19]
Freeman et al.

[11] 4,291,823
[45] Sep. 29, 1981

[54] TRACK-MOUNTED PULL-DOWN LUGGAGE-CARRIER FOR AUTOMOBILES

[76] Inventors: James D. Freeman, 19 Hedge Dr., Springfield, Ill. 62702; Robert L. Freeman, 262 Stutely, Springfield, Ill. 62704

[21] Appl. No.: 94,971

[22] Filed: Nov. 16, 1979

[51] Int. Cl.³ .............................................. B60R 9/00
[52] U.S. Cl. .................................................. 224/310
[58] Field of Search ............... 224/310, 319, 321, 328, 224/330

[56] References Cited

U.S. PATENT DOCUMENTS

| | | | |
|---|---|---|---|
| 3,112,041 | 11/1963 | Havens | 224/310 X |
| 3,193,124 | 7/1965 | Essling | 224/310 X |
| 3,712,524 | 1/1973 | Ames, Sr. | 224/310 |
| 4,003,485 | 1/1977 | Edgerton | 224/310 X |
| 4,039,096 | 8/1977 | McAllister | 224/310 X |

Primary Examiner—Steven M. Pollard
Attorney, Agent, or Firm—Ralph F. Staubly

[57] ABSTRACT

A track-mounted trunk-type luggage-carrier body is longitudinally movable from its transporting position on the top of a station wagon (or van, panel-truck or like vehicle) to its loading position when pulled-down at the back of the vehicle. The tracks are C-shaped in cross-section and the carrier has a pair of wheels adjacent its front end guided therein. Tensioned coil springs may be used to pull the carrier body forwardly. Removable stop means normally prevent the wheels from leaving the rear track ends. Resilient bumpers on the bottom of the carrier prevent damage to the top and rear surfaces of the vehicle. Optionally, roller means can be attached to the vehicle surface adjacent the junction of its top and rear surface portions to protectively and easily guide the carrier body past the junction area.

11 Claims, 9 Drawing Figures

U.S. Patent Sep. 29, 1981 4,291,823
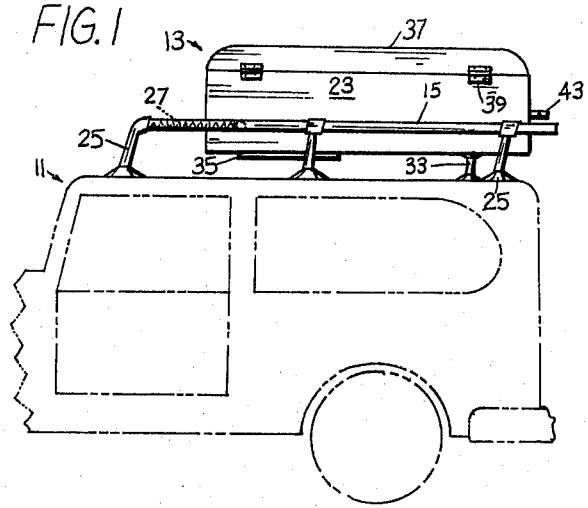
FIG. 1
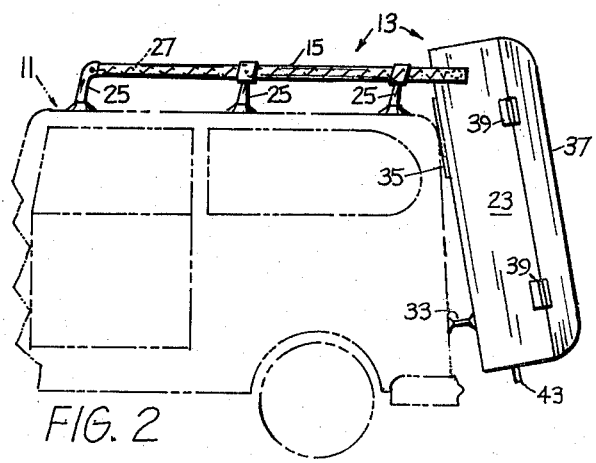
FIG. 2
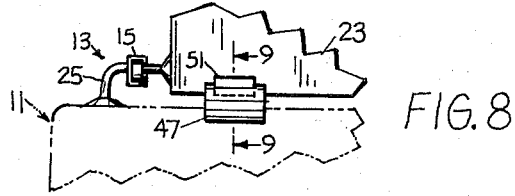
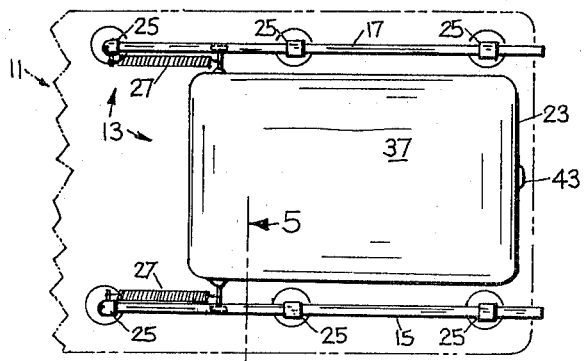
FIG. 3
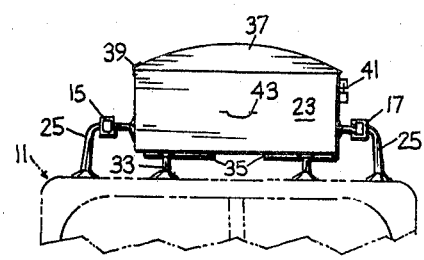
FIG. 4
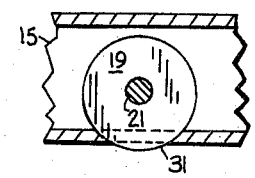
FIG. 7
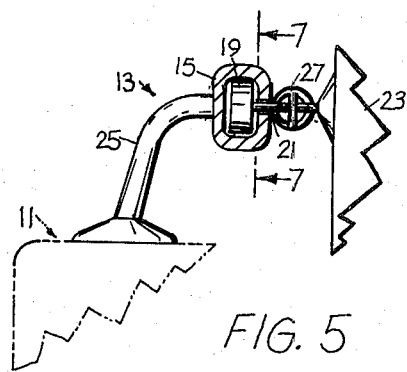
FIG. 5
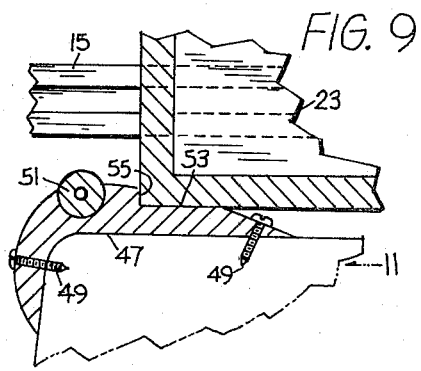
FIG. 9
FIG. 8
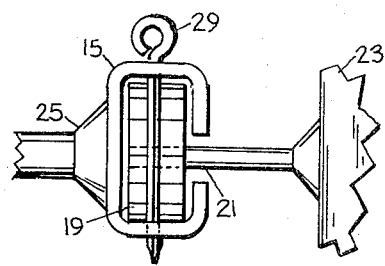
FIG. 6

TRACK-MOUNTED PULL-DOWN LUGGAGE-CARRIER FOR AUTOMOBILES

BACKGROUND AND OBJECTS OF THE INVENTION

It is known to attach rollers to the top of an automotive vehicle to aid in loading or unloading a boat or like object for transportation, e.g. U.S. Pat. No. 2,247,128 to Levey. It is also known to attach a luggage carrier to an automobile for swinging from a position above the rear thereof to a position well behind the vehicle, e.g. U.S. Pat. No. 2,800,264 to McFadyen. But it is not known to provide such a vehicle with a luggage carrier which is supported at its front end by wheels guided in parallel longitudinally disposed top-mounted tracks, and which carrier is movable rearwardly and downwardly to an upright vehicle-attached position for loading and unloading. It is the principal object of this invention to provide such a luggage carrier. Other objects and advantages will become apparent as the following detailed description proceeds.

BRIEF DESCRIPTIONS OF THE DRAWING FIGURES

FIG. 1 is a side elevational view of a preferred embodiment of the invention.

FIG. 2 is a view like FIG. 1 with the carrier lowered to its loading or unloading position.

FIG. 3 is a plan view of the showing of FIG. 1.

FIG. 4 is an end elevational view of the showing of FIG. 1.

FIG. 5 is an enlarged fragmentary elevational view in section on the line 5—5 of FIG. 3.

FIG. 6 is an enlarged fragmentary elevational view of the left track of FIG. 4 with a wheel-stopping pin added.

FIG. 7 is an enlarged fragmentary elevational view of the wheel and a modified track in section on the line 7—7 of FIG. 5.

FIG. 8 is an enlarged fragmentary rear elevational view of a modified embodiment.

FIG. 9 is a further enlarged side view of the showing of FIG. 8 in section on the line 9—9 of FIG. 8.

DETAILED DESCRIPTION

With reference now to the drawings, the numeral 11 generally designates a van-type vehicle, while 13 generally designates the carrier assemblage. The assemblage 13 comprises a parallel pair of tracks 15 and 17, C-shaped in cross-section to guidingly embrace a wheel 19 and its axle 21 fixed to each side of a trunk-like carrier body 23 adjacent the front end of said body.

The tracks 15 and 17 are attached to the vehicle top by a plurality of brackets 25, the bases of which are welded or otherwise fastened to said vehicle top. A pair of coil-springs 27 may be employed to pull and to hold the carrier body 23 to and in its FIG. 1 position. The tracks 15 and 17 extend sufficiently rearwardly to permit the carrier body 13 to be supported vertically, or almost vertically, from the tracks when it is lowered to its FIG. 2 position for loading or unloading. In said position the wheels 19 are prevented from leaving the tracks by the springs 27 and/or by removable stop pins 29 (FIG. 6) and/or drop-in depressions or notches 31 in the tracks (FIG. 7). The notches 31 can be duplicated adjacent the front ends of the tracks to minimize longitudinal movements of the carrier body during motion of the vehicle.

The under surface of the carrier body 23 is provided with resilient bumpers 33 and pads 35 to prevent damaging the vehicle surfaces while the carrier body is being shifted, or is being loaded or unloaded or transported.

The carrier body 23 may have a top 37 hinged at 39 and have a padlock-receiving hasp 41. It may also include a conventional bail-type handle 43, and another padlock-receiving hasp 45 for securing the carrier body to the vehicle 11. As a further security feature the bow of a common padlock can be substituted for one or both of the stop pins 29.

A further refinement (disclosed in FIGS. 8 and 9) comprises one or more members 47 attachable (as by screws 49) to the vehicle 11 adjacent the junction between its top and rear surfaces. Member 47 has a roller 51 mounted therein to be engaged by the bottom surface of the carrier body 23 as it is moved between its FIG. 1 and FIG. 2 positions. The member 47 desirably is provided with a drop-in seat 53 to form an achoring abutment 55 behind the lower rear edge of the carrier body 23 (FIG. 9).

The invention having been described, what is claimed is:

1. A top-mounted pull-down luggage carrier for automotive vehicles, comprising: a pair of tracks adapted for parallel longitudinally disposed attachment to the top surface of a vehicle, a carrier body having a pair of low-friction means fixed thereto adjacent the front portion thereof and guidedly engaged with said tracks, cam-like means interacting between the under surface of said carrier body and adjacent top rear surfaces of said vehicle to protect said adjacent top rear vehicle surfaces as said carrier rests thereupon and/or is moved rearwardly and downwardly thereover while being continuously attached to and partially supported by said tracks, said cam-like means having a upwardly convex surface which is shaped first to lift said carrier body slightly as it moves upwardly and forwardly over said cam-like means and secondly to drop forwardly beyond a vertically disposed abutment for arresting rearward movement of said carrier body unless slightly lifted to clear said abutment.

2. A luggage carrier according to claim 1 wherein said luggage carrier additionally comprises resilient bumper elements fixed to the under surface of said carrier body.

3. A luggage carrier according to claim 2 and additionally comprising roller means attached to the vehicle surface adjacent the junction of its top and rear surface portions for protecting said surface portions and for low-frictionally guiding said carrier body thereover.

4. A luggage carrier according to claim 1 and additionally comprising roller means attached to the vehicle surface adjacent the junction of its top and rear surface portions for protecting said surface portions and for low-frictionally guiding said carrier body thereover.

5. A luggage carrier according to claim 1 and additionally comprising security-locking means co-acting between said carrier body and said vehicle.

6. A luggage carrier according to claim 1 and additionally comprising tension-coil-spring means co-acting between said tracks and said carrier body for pulling the latter forwardly over said vehicle.

7. A luggage carrier according to claim 1 and additionally comprising stop means for arresting extreme rearward movement of said carrier body.

8. A luggage carrier according to claim 7 wherein said stop means are a pair of vertically removable pins blocking the rear exits of said tracks.

9. A luggage carrier according to claim 1 wherein said tracks are C-shaped channel-bars and said low-friction means are wheels retained in said channel-bars.

10. A luggage carrier according to claim 9 wherein said stop means is at least one pair of wheel-receiving depressions in said tracks.

11. A luggage carrier according to claim 1 and additionally comprising roller means forming a part of said cam-like means.

* * * * *